(12) United States Patent
Chen (10) Patent No.: US 7,095,244 B1
(45) Date of Patent: Aug. 22, 2006

(54) SYSTEM AND METHOD FOR DETERMINING OPERATIONAL STATES OF FIRST AND SECOND ELECTRICAL CONTACTS IN A MOTOR

(75) Inventor: Yulei Chen, Plymouth, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/256,466

(22) Filed: Oct. 21, 2005

(51) Int. Cl.
- *G01R 31/34* (2006.01)
- *G01R 31/08* (2006.01)
- *H02P 3/22* (2006.01)

(52) U.S. Cl. ............... 324/772; 324/522; 318/375
(58) Field of Classification Search ............ 324/772, 324/522; 318/375
See application file for complete search history.

(56) References Cited

U.S. PATENT DOCUMENTS

| | | | | |
|---|---|---|---|---|
| 4,990,837 A | * | 2/1991 | Ishitobi | 318/375 |
| 5,574,346 A | * | 11/1996 | Chavan et al. | 318/434 |
| 2005/0185350 A1 | * | 8/2005 | Wakefield et al. | 361/23 |

* cited by examiner

*Primary Examiner*—Anjan Deb
*Assistant Examiner*—Amy He
(74) *Attorney, Agent, or Firm*—Michael D. Smith (57) ABSTRACT

A system and a method for determining operational states of first and second electrical contacts in a motor are provided. The motor has first, second, and third phase windings. The first phase winding is electrically coupled between first and second nodes. The second phase winding is electrically coupled between a third node and the second node. The third phase winding is electrically coupled between a fourth node and the second node. The first electrical contact is electrically coupled between the first node and the third node. The second electrical contact is electrically coupled between the third node and the fourth node. The method includes applying a first voltage signal to the first phase winding at a first time and measuring voltage signals at the third and fourth nodes to determine first and second operational states of the first and second electrical contacts.

14 Claims, 7 Drawing Sheets

SYSTEM AND METHOD FOR DETERMINING OPERATIONAL STATES OF FIRST AND SECOND ELECTRICAL CONTACTS IN A MOTOR

TECHNICAL FIELD

The present application relates to a system and a method for determining operational states of first and second electrical contacts in a motor.

BACKGROUND

An active rear steering system utilizes a three phase brushless DC motor to position rear wheels of a vehicle. When the active rear steering system is not activated, it is desirable to short three phase windings of the DC motor together by closing a pair of electrical contacts, to generate a braking force to prevent movement of the rear wheels by the DC motor. If the pair of electrical contacts do not have a closed operational position when the active rear steering system is not activated, the braking force is not generated.

Alternately, when the active rear steering system is activated, it is desirable to open the pair of electrical contacts to allow desired operation of the DC motor. If the pair of electrical contacts do not have an open operational position when the active rear steering system is activated, the operation of the motor is degraded.

The inventor herein has recognized a need for a system and a method for determining the operational states of the pair of contacts in the motor of the active rear steering system.

SUMMARY

A method for determining operational states of first and second electrical contacts in a motor in accordance with an exemplary embodiment is provided. The motor has first, second, and third phase windings. The first phase winding is electrically coupled between first and second nodes. The second phase winding is electrically coupled between a third node and the second node. The third phase winding is electrically coupled between a fourth node and the second node. The first electrical contact is electrically coupled between the first node and the third node. The second electrical contact is electrically coupled between the third node and the fourth node. The method includes applying a first voltage signal to the first phase winding at a first time. The method further includes measuring a second voltage signal at the third node coupled to the second phase winding. The method further includes measuring a third voltage signal at the fourth node coupled to the third phase winding. The method further includes determining first and second operational states of the first and second electrical contacts, respectively, based on first and second amplitudes of the second and third voltage signals, respectively, at a second time, the second time being a predetermined time period after the first time.

A system for determining operational states of first and second electrical contacts in a motor in accordance with another exemplary embodiment is provided. The motor has first, second, and third phase windings. The first phase winding is electrically coupled between first and second nodes. The second phase winding is electrically coupled between a third node and the second node. The third phase winding is electrically coupled between a fourth node and the second node. The first electrical contact is electrically coupled between the first node and the third node. The second electrical contact is electrically coupled between the third node and the fourth node. The system includes a motor control circuit electrically coupled to the first, second, and third nodes of the motor. The system further includes a processor electrically coupled to the motor control circuit. The processor is configured to induce the motor control circuit to apply a first voltage signal to the first phase winding at a first time. The processor is further configured to measure a second voltage signal at the third node coupled to the second phase winding. The processor is further configured to measure a third voltage signal at the fourth node coupled to the third phase winding. The processor is further configured to determine first and second operational states of the first and second electrical contacts, respectively, based on first and second amplitudes of the second and third voltage signals, respectively, at a second time. The second time is a predetermined time period after the first time.

DETAILED DESCRIPTION OF EXEMPLARY EMBODIMENTS

Figure 1:
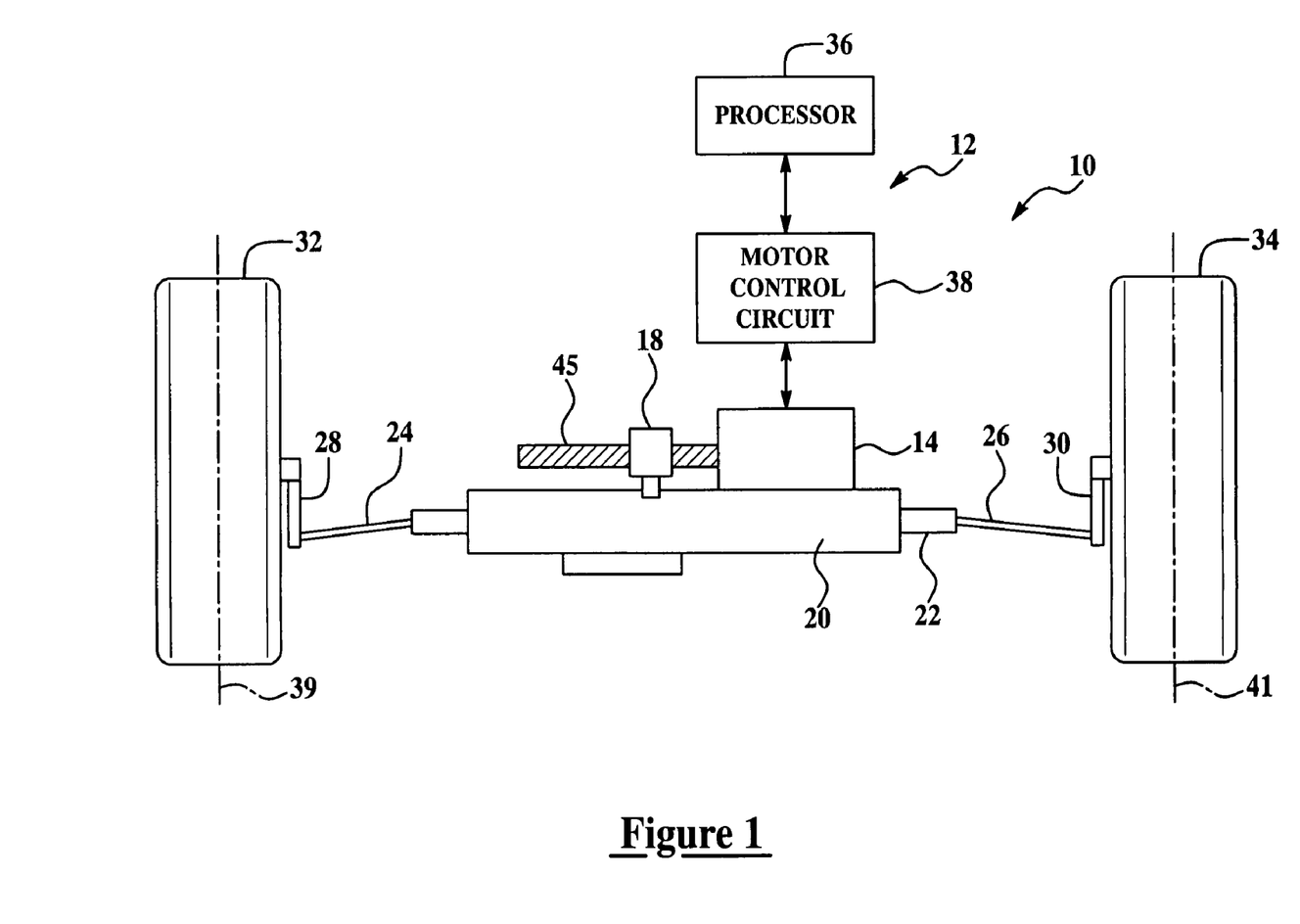
FIG. 1 is a block diagram of an active rear steering system of a vehicle having a processor, a motor control circuit, and a motor.

Referring to FIG. 1, a vehicle 10 having an active rear steering system 12 is illustrated. The active rear steering system 12 has an active operational state where the system 10 is utilized to move the rear vehicle wheels 32, 34 to desired rotational positions. Further, the active rear steering system 12 has an inactive operational state where the system 10 does not move the rear vehicle wheels 32, 34. The active rear steering system 12 includes a motor 14, a drive mechanism 18, a steering rack 20, a rack shaft 22, tie rods 24, 26, knuckle arms 28, 30, rear vehicle wheels 32, 34, a processor 36, and a motor control circuit 38.

Figure 2:
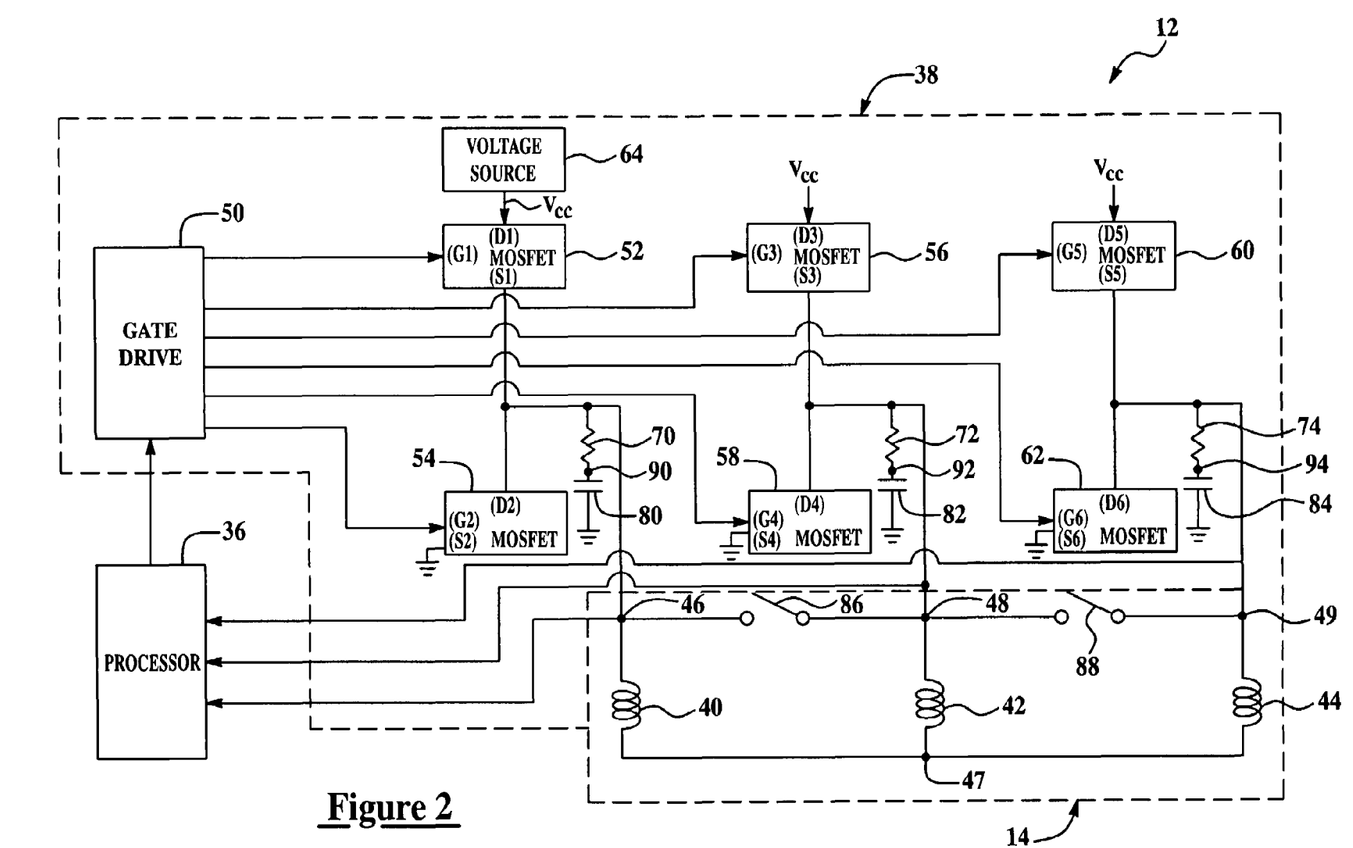
FIG. 2 is an electrical schematic of the active rear steering system of FIG. 1.
Figure 3:
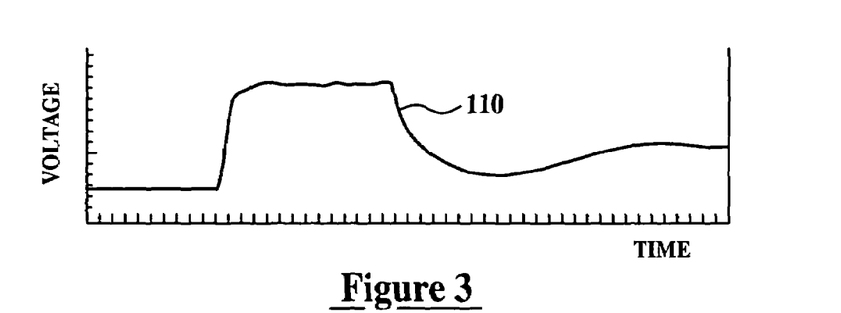
FIGS. 3–6 are schematics of diagnostic signals generated by the active rear steering system of FIG. 1 when the active rear steering system has an active operational state and no operational error condition has been detected.
Figure 4:
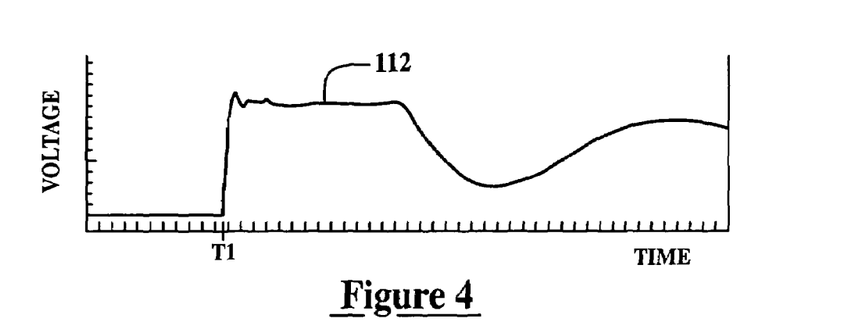
Figure 5:
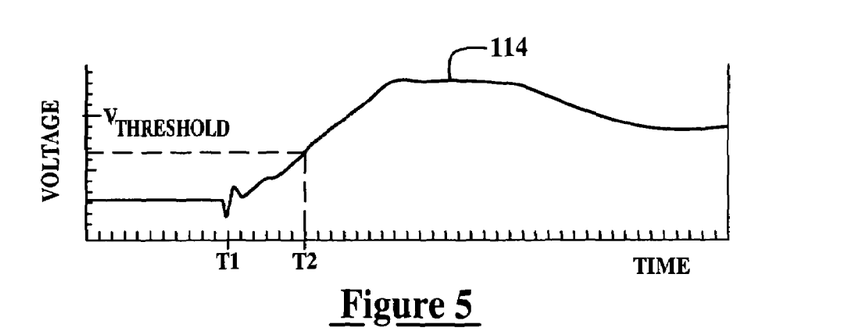
Figure 6:
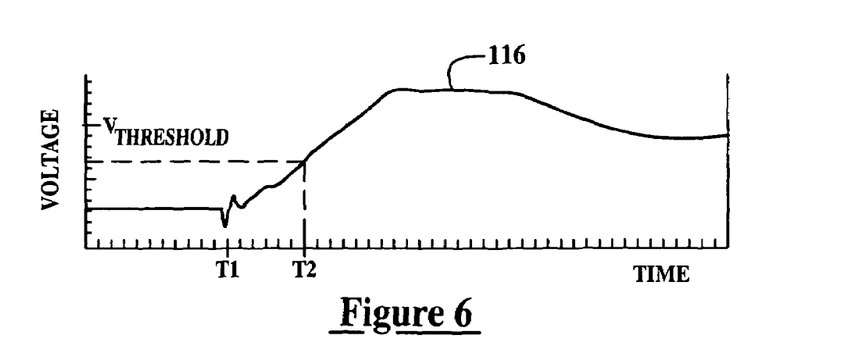
Figure 7:
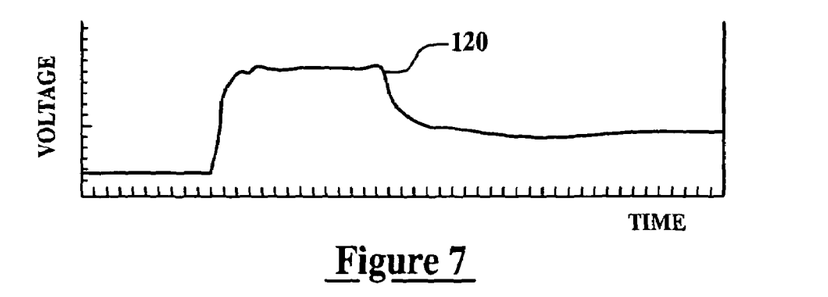
FIGS. 7–10 are schematics of diagnostic signals generated by the active rear steering system when the active rear steering system has an inactive operational state and no operational error condition has been detected.
Figure 8:
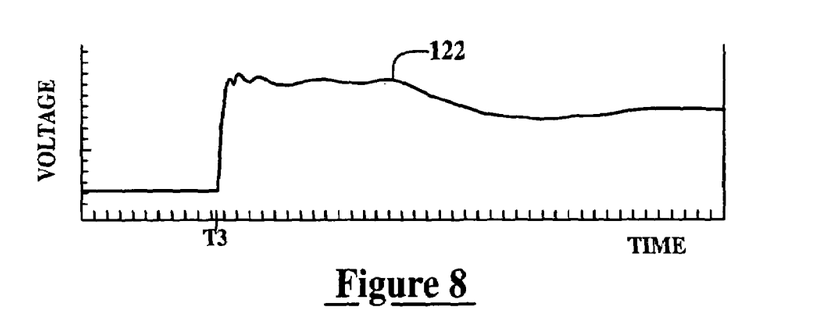
Figure 9:
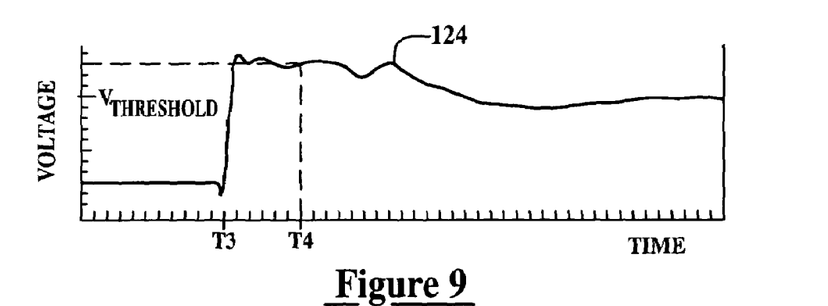
Figure 10:
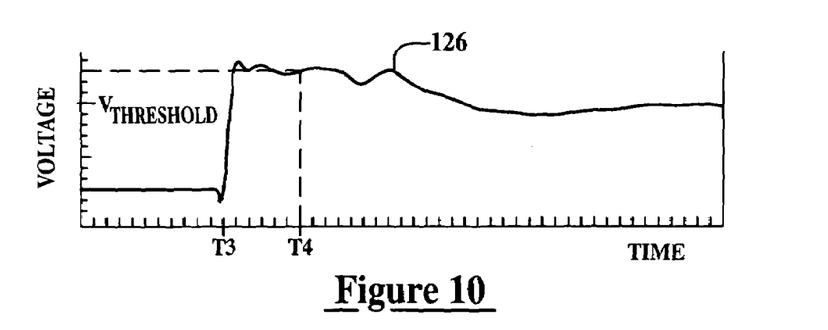

The motor 14 is provided to drive the drive mechanism 18 for moving the vehicle wheels 32, 34 to predetermined positions. The motor 14 includes phase windings 40, 42, 44 electrical contacts 46, 48 and the rotor 45. The phase winding 40 is electrically coupled between a node of 46 and a node 47. The phase winding 142 is electrically coupled between node 48 and the node 47. Further, the phase winding 144 is electrically coupled between a node 49 and the node 47. The phase windings 40, 42, 44 can be energized via the motor control circuit 38 to induce the rotor shaft 45 to rotate in either a first direction or a second direction opposite the first direction. The drive mechanism 18 converts the rotational motion of the rotor shaft 45 to a linear motion of the steering rack 20 and the rack shaft 22. The rack shaft 22 is operably coupled to the tie rods 24, 26 that are further operably coupled to the knuckle arms 28, 30, respectively. Further, the knuckle arms 24, 26 are operably coupled to the rear vehicle wheels 32, 34 respectively. When the motor shaft 45 rotates in a first rotational direction, the rack shaft 22 is moved in a first linear direction. In response, the tie rods 24, 26 and the knuckle arms 28, 30 induce the vehicle wheels 32, 34, respectively, to rotate in a first predetermined direction about steering axes 39, 41, respectively, associated with the vehicle wheels 32, 34, respectively, toward a desired rear vehicle wheel steering angle. Alternately, when the motor shaft 45 rotates in a second rotational direction, the rack shaft 22 is moved in a second linear direction, opposite the first linear direction. In response, the tie rods 24, 26 and the knuckle arms 28, 3 induce the vehicle wheels 32, 34, respectively, to rotate in a second predetermined direction about steering axes 39, 41 respectively, associated with the vehicle wheels 32, 34, respectively, toward a desired rear vehicle wheel steering angle.

The electrical contacts 86, 88 are provided to have closed operational states when the active rear steering system 12 is in an inactive operational state. When the electrical contacts 86, 88 have the closed operational state, the motor 14 is prevented from rotating the rotor shaft 45 in response to voltage signals from the transistors. Further, the electrical contacts 86, 88 are provided to have open operational states when the active rear steering system 12 is an active operational state, to allow the motor 14 to rotate the rotor shaft 45 in response to voltage signals from the transistors.

The processor 36 is provided to generate command signals that induce the motor control circuit 38 to generate voltage signals that are applied to the phase windings 40, 42, 44 to induce rotation of the rotor 45. Further, the processor 36 is provided to generate command signals that induce the motor control circuit 38 to generate voltage signals are applied to the phase windings 40, 42 for determining operational states of the electrical contacts 86, 88, as will be explained in greater detail below. The processor 36 is electrically coupled to the gate drive 50 and to the nodes 46, 48, 49 of the motor 14.

The motor control circuit 38 is provided to generate voltage signals that are applied to the phase windings 40, 42, 44 in response command signals received from the processor 36. The motor control circuit 38 includes a gate drive 50, transistors 52, 54, 56, 58, 60, 62, a voltage source 64, resistor 70, 72, 74 and capacitors 80, 82, 84.

The gate drive 50 is provided to control operation of the transistors 52, 54, 56, 58, 60 and 62 in response to command signals received from the processor 36. The gate drive 50 is electrically coupled to gates of the transistors 50, 52, 54, 56, 58, 60 and 62.

The transistors 50, 52, 54, 56, 58, 60, 62 are provided to supply voltage signals to the phase windings 40, 42, 44 of the motor 14. The transistor 52 has a gate terminal (G1) electrically coupled to the gate drive 50, a drain terminal (D1) electrically coupled to the voltage source 64, and a source terminal (S1) electrically coupled to both a drain terminal (D2) of the transistor 54 and the node 70. The transistor 54 has a gate terminal (G2) electrically coupled to the gate drive 50, a drain terminal (D2) electrically coupled both a source terminal (S1) of the transistor 52 and the node 70, and a source terminal (S2) electrically coupled to electrical ground. A series combination of the resistor 70 and the capacitor 80 are electrically coupled between the node 46 and electrical ground. The transistor 56 has a gate terminal (G3) electrically coupled to the gate drive 50, a drain terminal (D3) electrically coupled to the voltage source 64, and a source terminal (S3) electrically coupled to both a drain terminal (D4) of transistor 58 and the node 48. The transistor 58 has a gate terminal (G4) electrically coupled to the gate drive 50, a drain terminal (D4) electrically coupled both a source terminal (S3) of the transistor 56 and the node 48, and a source terminal (S4) electrically coupled to electrical ground. A series combination of the resistor 72 and the capacitor 82 are electrically coupled between the node 48 and electrical ground. The transistor 60 has a gate terminal (G5) electrically coupled to the gate drive 50, a drain terminal (D5) electrically coupled to the voltage source 64, and a source terminal (S5) electrically coupled to both a drain terminal (D6) of the transistor 62 and the node 49. The transistor 62 has a gate terminal (G6) electrically coupled to the gate drive 50, a drain terminal (D6) electrically coupled both a source terminal (S5) of the transistor 60 and the node 49, and a source terminal (S6) electrically coupled to electrical ground. A series combination of the resistor 74 and capacitor 84 are electrically coupled between the node 49 and electrical ground.

Referring to FIGS. 3–6, a brief explanation of the signals generated in the motor control circuit 38 when the active rear steering system 12 has an active operational state and the relay contacts 86, 88 have desired open operational positions will be provided. It should be noted that the relay contacts 86, 88 should have open operational positions when the active rear steering system 12 has an active operational state to allow the motor 14 to rotate the rotor shaft 45. The voltage signal 110 corresponds to a drive signal applied to the gate (G1) of the transistor 52. The voltage signal 112 corresponds to a voltage signal at the node 46 that is measured by the processor 36. The voltage signal 114 corresponds to a voltage signal at the node 48 that is measured by the processor 36. The voltage signal 116 corresponds to a voltage signal at the node 49 that is measured by the processor 36. When the voltage signal 112 increases to a high voltage level at time T1, a timer (not shown) within the processor 36 is started. When the amplitude of voltage signal 114 at time T2 is less than a threshold amplitude ($V_{Threshold}$), the processor 36 determines that the electrical contact 86 has an open operational position. Similarly, when the amplitude of voltage signal 116 at time T2 is less than the threshold amplitude ($V_{Threshold}$), the processor 36 determines that the electrical contact 88 has an open operational position. In one embodiment, the time period between time T1 and time T2 is in a range of 1–5 microseconds. Of course, in alternative embodiments, the time period between time T1 and time T2 can be less than 1 microsecond, or greater than 5 microseconds.

Alternately, when the active rear steering system 12 has an active operational state and the amplitude of both voltage signals 114, 116 at time T2 are greater than or equal to the threshold amplitude ($V_{Threshold}$), the processor 36 determines that the electrical contacts 86, 88 have closed open operational positions, indicating an operational error condition.

Referring to FIGS. 7–10, a brief explanation of signals generated in the motor control circuit 38 when the active rear steering system 12 has an inactive operational state and the relay contacts 86, 88 have desired closed operational positions. It should be noted that the relay contacts 86, 88 should have closed operational positions when the active rear steering system 12 has an inactive operational state to prevent the motor 14 from rotating the rotor shaft 45. The voltage signal 120 corresponds to a drive signal applied to the gate (G1) of the transistor 52. The voltage signal 122 corresponds to a voltage signal at the node 46 that is measured by the processor 36. The voltage signal 124 corresponds to a voltage signal at the node 48 that is measured by the processor 36. The voltage signal 126 corresponds to a voltage signal at the node 49 that is measured by the processor 36. When the voltage signal 122 increases to a high voltage level at time T3, the timer within the processor 36 is started. When the amplitude of voltage signal 124 at time T4 is greater than or equal to the threshold amplitude ($V_{Threshold}$), the processor 36 determines that the electrical contact 86 has a closed operational position. Similarly, when the amplitude of voltage signal 126 at time T4 is greater than or equal to the threshold amplitude ($V_{Threshold}$), the processor 36 determines that the electrical contact 88 has a closed operational position.

Alternately, when the active rear steering system 12 has an inactive operational state and the amplitude of both voltage signals 114, 116 at time T4 are less than the threshold amplitude ($V_{Threshold}$), the processor 36 determines that the electrical contacts 86, 88 have open operational positions, indicating an operational error condition.

Referring to FIGS. 11–13, and FIGS. 3–6 a method for determining operational states of the electrical contacts 86, 88 of the motor 14 in accordance with an exemplary embodiment will now be described. The method can be implemented utilizing the processor 36 and the motor control circuit 38 discussed above.

Figure 11:
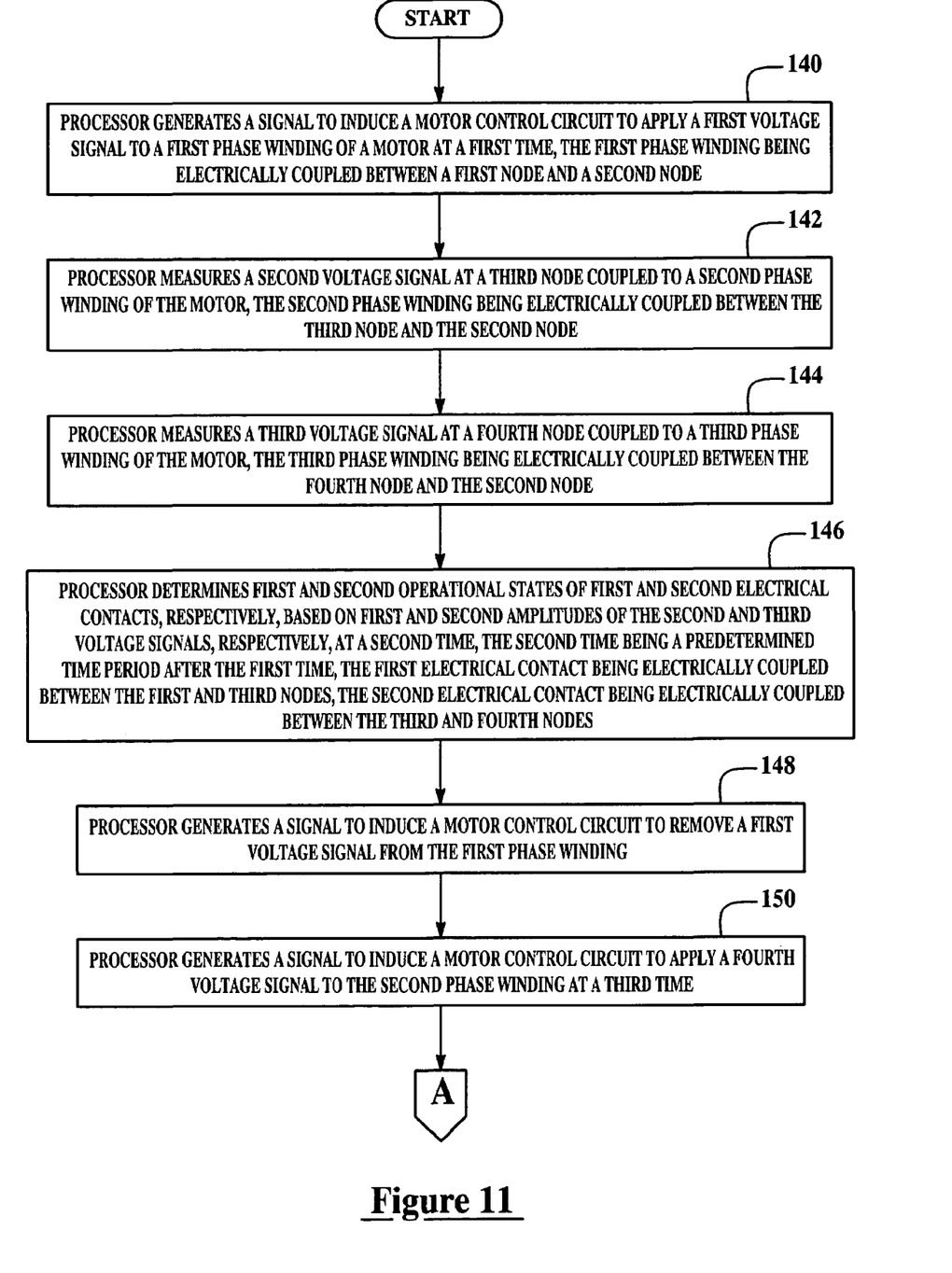
FIGS. 11–13 are flowcharts of a method for determining operational states of first and second electrical contacts of the motor in accordance with an exemplary embodiment.

At step 140, the processor 36 generates a signal to induce the motor control circuit 38 to apply a first voltage signal to a phase winding 40 of the motor 14 at a first time T1. For example, the processor 36 can generate a signal that induces the gate drive 52 to output a gate drive signal 110 that is received at the gate terminal (G1) of the transistor 52. In response, the transistor 52 outputs the voltage signal 112 to the phase winding 40 of the motor 14 at the first time T1.

At step 142, the processor 36 measures a second voltage signal at the node 48 coupled to a phase winding 48 of the motor 14. For example, the processor 36 can measure the voltage signal 116 at the node 49.

At step 144, the processor 36 measures a third voltage signal at the node 49 coupled to the phase winding 44 of the motor 14. For example, the processor 36 can measure the voltage signal 114 at the node 48.

At step 146, the processor 36 determines first and second operational states of electrical contacts 86, 88, respectively, based on first and second amplitudes of the second and third voltage signals, respectively, at a second time T2. The second time T2 is a predetermined time period after the first time T1. For example, the processor 36 can determine first and second operational states of electrical contacts 86, 88, respectively, based on first and second amplitudes of the voltage signals 114, 116, respectively, at the second time T2.

At step 148, the processor 36 generates a signal to induce the motor control circuit 38 to remove the first voltage signal from the first phase winding.

Figure 12:
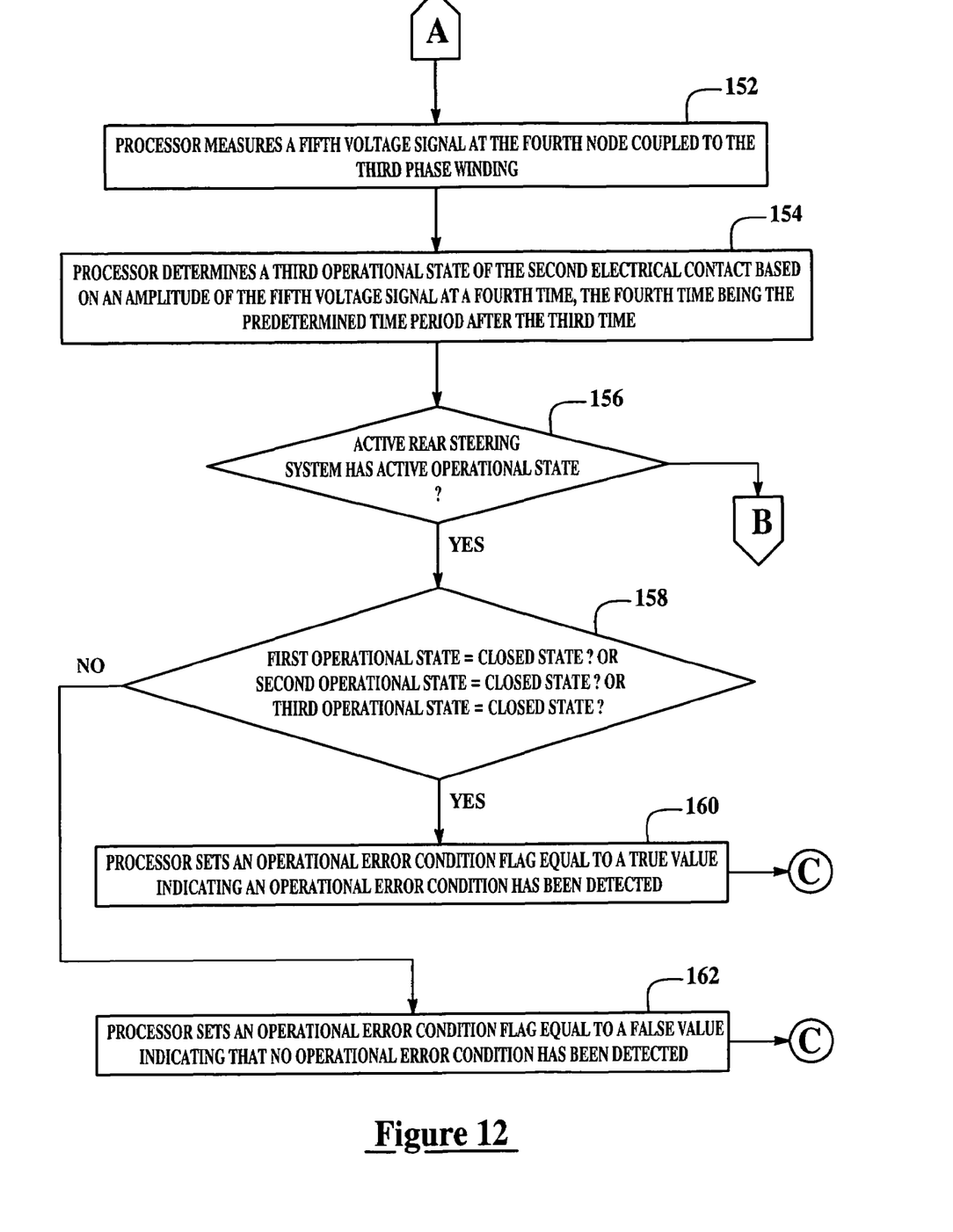

At step 150, the processor 36 generates a signal to induce the motor control circuit 38 to apply a fourth voltage signal to the second phase winding at a third time.

At step 152, the processor 36 measures a fifth voltage signal at the fourth node coupled to the third phase winding.

At step 154, the processor 36 determines a third operational state of the second electrical contact based on an amplitude of the fifth voltage signal at a fourth time. The fourth time is a predetermined time period after the third time.

At step 156, the processor 36 makes a determination as to whether the active rear steering system 12 has an active operational state. If the value of step 156 equals "yes", the method advances to step 158. Otherwise, the method is exited.

At step 158, the processor 36 makes a determination as to whether any of the following conditions are present: (i) first operational state equals a closed state, (ii) second operational state equals a closed state, or (iii) third operational state equals a closed state. If the value of step 158 equals the "yes", the method advances to step 160. Otherwise, the method advances to step 162.

At step 160, the processor 36 sets an operational error condition flag equal to a true value indicating that an operational error condition has been detected. After step 160, the method is exited.

At step 162, the processor 36 sets the operational error condition flag equal to a false value indicating that no operational error condition has been detected. After step 162, the method is exited.

Figure 13:
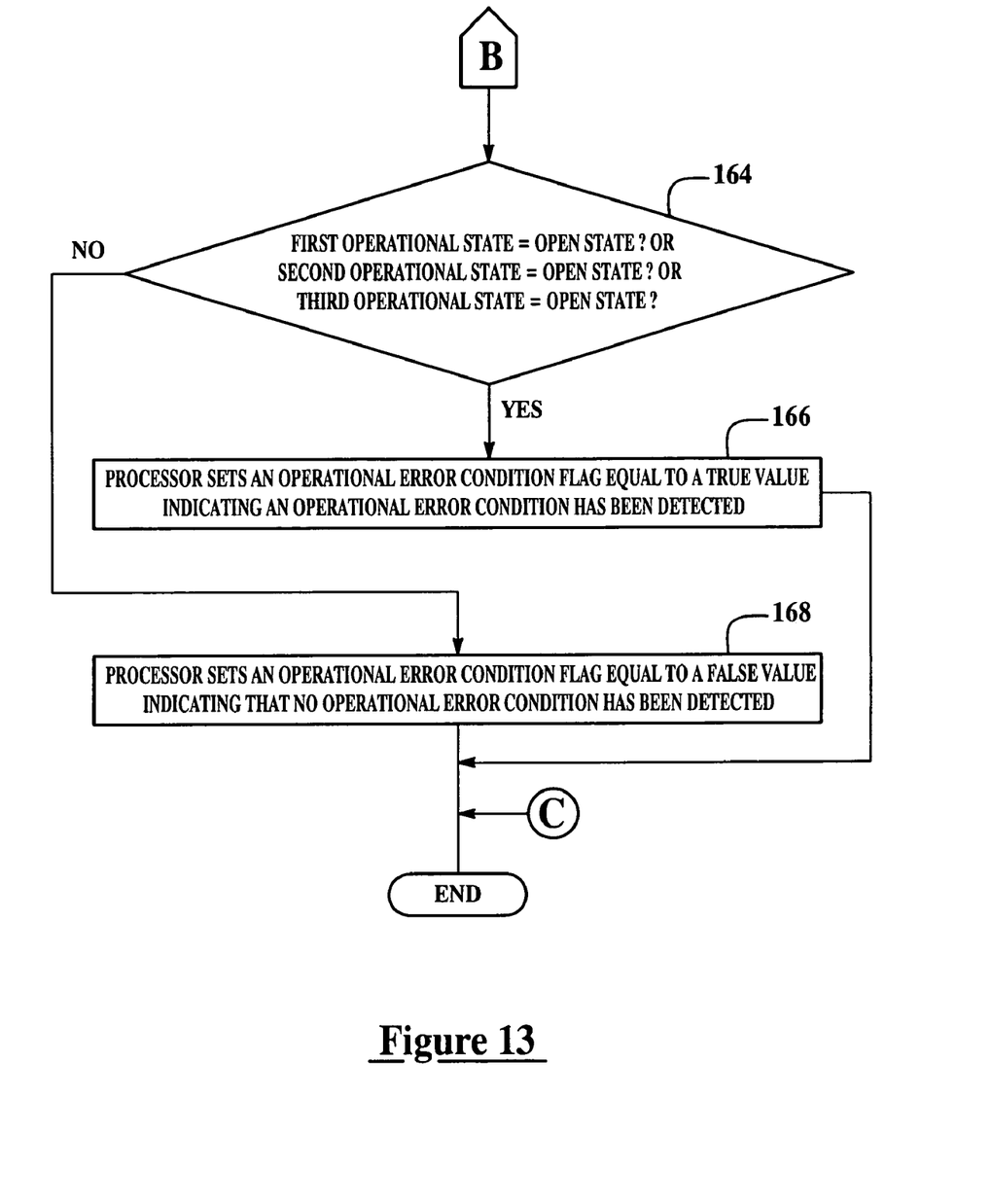

Referring again to step 156, if the value of step 156 equals "no," the method advances to step 164. At step 164, the processor 36 makes a determination as to whether any of the following conditions are present: (i) first operational state equals an open state, (ii) second operational state equals an open state, or (iii) third operational state equals an open state. If the value of step 164 equals "yes", the method advances to step 166. Otherwise, the method advances to step 168.

At step 166, the processor 36 sets the operational error condition flag equal to a true value indicating an operational error condition has been detected. After step 166, the method is exited.

At step 168, the processor 36 sets the operational error condition flag equal to a false value indicating that no operational error condition has been detected. After step 168, the method is exited.

The system and the method for determining the operational states of the pair of contacts of a motor in an active rear steering system provide a substantial advantage over other systems and methods. In particular, the system and method utilizes a processor and a motor control circuit, with no additional diagnostic hardware, for determining the operational states of the pair of contacts in the motor.

As described above, the present invention for determining the operational state of the pair of contacts of a motor can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

I claim:

1. A method for determining operational states of first and second electrical contacts in a motor, the motor having first, second, and third phase windings, the first phase winding being electrically coupled between first and second nodes, the second phase winding being electrically coupled between a third node and the second node, the third phase winding being electrically coupled between a fourth node and the second node, the first electrical contact being electrically coupled between the first node and the third node, the second electrical contact being electrically coupled between the third node and the fourth node, the method comprising:

applying a first voltage signal to the first phase winding at a first time;

measuring a second voltage signal at the third node coupled to the second phase winding;

measuring a third voltage signal at the fourth node coupled to the third phase winding; and determining first and second operational states of the first and second electrical contacts, respectively, based on first and second amplitudes of the second and third voltage signals, respectively, at a second time, the second time being a predetermined time period after the first time.

2. The method of claim 1, wherein the operational state of the first electrical contact is a closed state when the first amplitude of the second voltage signal is greater than or equal to a threshold amplitude at the second time.

3. The method of claim 1, wherein the second operational state of the second electrical contact is a closed state when the second amplitude of the third voltage signal is greater than or equal to a threshold amplitude at the second time.

4. The method of claim 1, wherein the first operational state of the first electrical contact is an open state when the first amplitude of the second voltage signal is less than a threshold amplitude at the second time.

5. The method of claim 1, wherein the second operational state of the second electrical contact is an open state when the second amplitude of the third voltage signal is less than a threshold amplitude at the second time.

6. The method of claim 1, wherein the predetermined time period is in a range of 1–5 microseconds.

7. The method of claim 6, further comprising:

removing the first voltage signal from the first phase winding;

applying a fourth voltage signal to the second phase winding at a third time;

measuring a fifth voltage signal at the fourth node coupled to the third phase winding; and determining a third operational state of the second electrical contact based on an amplitude of the fifth voltage signal at a fourth time, the fourth time being the predetermined time period after the third time.

8. A system for determining operational states of first and second electrical contacts in a motor, the motor having first, second, and third phase windings, the first phase winding being electrically coupled between first and second nodes, the second phase winding being electrically coupled between a third node and the second node, the third phase winding being electrically coupled between a fourth node and the second node, the first electrical contact being electrically coupled between the first node and the third node, the second electrical contact being electrically coupled between the third node and the fourth node, the system comprising:

a motor control circuit electrically coupled to the first, second, and third nodes of the motor; and a processor electrically coupled to the motor control circuit, the processor configured to induce the motor control circuit to apply a first voltage signal to the first phase winding at a first time, the processor further configured to measure a second voltage signal at the third node coupled to the second phase winding, the processor further configured to measure a third voltage signal at the fourth node coupled to the third phase winding, the processor further configured to determine first and second operational states of the first and second electrical contacts, respectively, based on first and second amplitudes of the second and third voltage signals, respectively, at a second time, the second time being a predetermined time period after the first time.

9. The system of claim 8, wherein the operational state of the first electrical contact is a closed state when the first amplitude of the second voltage signal is greater than or equal to a threshold amplitude at the second time.

10. The system of claim 8, wherein the second operational state of the second electrical contact is a closed state when the second amplitude of the third voltage signal is greater than or equal to a threshold amplitude at the second time.

11. The system of claim 8, wherein the first operational state of the first electrical contact is an open state when the first amplitude of the second voltage signal is less than a threshold amplitude at the second time.

12. The system of claim 8, wherein the second operational state of the second electrical contact is an open state when the second amplitude of the third voltage signal is less than a threshold amplitude at the second time.

13. The system of claim 8, wherein the predetermined time period is in a range of 1–5 microseconds.

14. The system of claim 8, wherein the processor is further configured to induce the motor control circuit to remove the first voltage signal from the first phase winding, the processor further configured to apply a fourth voltage signal to the second phase winding at a third time, the processor further configured to measure a fifth voltage signal at the fourth node coupled to the third phase winding, the processor further configured to determine a third operational state of the second electrical contact based on an amplitude of the fifth voltage signal at a fourth time, the fourth time being the predetermined time period after the third time.

* * * * *